United States Patent Office
3,385,852
Patented May 28, 1968

3,385,852
α-SUBSTITUTED 1-NAPHTHYLACETIC ACIDS
Silvano Casadio, Milan, Italy, assignor to Istituto de Angeli S.p.A., Milan, Italy, a corporation of Italy
No Drawing. Continuation-in-part of application Ser. No. 364,792, May 4, 1964. This application Apr. 23, 1965, Ser. No. 450,496
Claims priority, application Great Britain, May 14, 1963, 19,159/63; Aug. 7, 1964, 32,309/64; Oct. 1, 1964, 40,025/64; Oct. 12, 1964, 41,578/64
8 Claims. (Cl. 260—246)

ABSTRACT OF THE DISCLOSURE

The present application is directed to naphthylacetic acid derivatives and in particular to α,α-disubstituted naphthylacetic acids. The compounds of the invention fall within two distinct categories, that is, the "short chain" α,α-disubstituted naphthylacetic acids where the short chain substituent group is represented by the grouping —$CH_2$—$CH_2$—X, wherein X represents morpholino, piperidino or the grouping

where each of $R_4$ and $R_5$ represent an alkyl group of from 1 to 6 carbon atoms or benzyl. The compounds of the second category are the "long-chain" α,α-disubstituted naphthylacetic acids which are characterized by having on the α-carbon at least one substituent represented by the grouping —$(CH_2)_n$—X, wherein X is as above defined and n represents an integer of from 3 to 5. In each category, the second α-substituted substituent may be an alkyl of from 1 to 6 carbon atoms or a grouping similar to that represented by the —$CH_2$—$CH_2$—X on the "short chain" compounds and the —$(CH_2)_n$—X in the "long chain" compounds. The compounds of the invention exhibit various therapeutic properties which make them particularly valuable.

This is a continuation-in-part of U.S. application Ser. No. 364,792 filed on May 4, 1964 and now U.S. Patent No. 3,344,146 whose disclosure is accordingly incorporated herein by reference.

This invention relates to new α-substituted 1-naphthylacetic acids having valuable pharmacological properties.

It is an object of the present invention to provide α-substituted 1-naphthylacetic acids having valuable antipyretic (and in most cases also anti-inflammatory) activity which may in addition, dependent on the exact structure, have choleretic or hypoglycemic activity.

It is a still further object of the present invention to provide α-substituted 1-naphthylacetic acids having useful hypoglycemic activity coupled with a relatively low toxicity.

These and other objects are fully attained by the present invention.

According to the present invention, there are provided "short-chain" α-substituted 1-naphthylacetic acids of the general formula

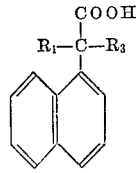

in which $R_1$ represents the group

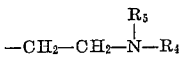

(wherein $R_4$ and $R_5$, which may be the same or different, each represents an alkyl or aralkyl group or $R_4$ and $R_5$ together with the adjacent nitrogen atom represent a heterocyclic group which may contain a further hetero atom); and $R_3$ represents a hydrogen atom, an alkyl group or any group which may be represented by $R_1$; and non-toxic salts thereof. The non-toxic salts may be salts formed with acids or bases. The term "short chain" is used herein in relation to compounds of Formula I to designate such compounds in which the alkyl radical of the α-aminoalkyl group contains only two carbon atoms.

It will be appreciated that compounds of the Formula I in which $R_1$ and $R_3$ represent different groups contain an asymmetric carbon atom. Optical isomers of such compounds as well as racemic mixtures thereof are included within the scope of the present invention.

These "short-chain" α-substituted 1-naphthylacetic acids according to the invention have valuable antipyretic activity and, in most cases, also have anti-inflammatory activity. In addition, dependent on their exact structure the compounds may have choleretic or hypoglycemic activity. Moreover they in general have a relatively low toxicity.

In compounds of the Formula I in which $R_3$, $R_4$ and/or $R_5$ represent alkyl groups, they preferably represent lower alkyl groups containing from 1 to 6 carbon atoms, e.g. methyl, ethyl, propyl, isopropyl, butyl, isobutyl, amyl and/or hexyl groups. Where $R_4$ or $R_5$ represents an aralkyl group, it preferably represents a benzyl group. Where $R_4$ and $R_5$, together with the nitrogen atom to which they are bonded, represent a heterocyclic group, they preferably represent a saturated heterocyclic group such as, for example, a morpholino or piperidino group. The heterocyclic group may if desired, as in the case of a morpholino group, contain a further hetero atom.

The non-toxic acid addition salts of compounds of Formula I may be formed both with organic and inorganic acids. Preferred non-toxic acid addition salts include, for example, hydrochlorides, hydrobromides, sulphates, formates, acetates, citrates, tartrates, maleates and cyclohexyl sulphamates. The salts with bases include salts formed both with organic and inorganic bases.

As stated above, the "short-chain" α-substituted 1-naphthylacetic acids of Formula I as defined above in general possess valuable antipyretic activity and, in most cases, also have anti-inflammatory activity. In addition, the compounds may have choleretic or hypoglycemic activity. The compound α-methyl-α-(2-morpholinoethyl)-1-naphthylacetic acid is of particular interest in view of its choleretic activity which is associated with a low toxicity; the $LD_{50}$ of this compound, administered orally, is 5,000 mg./kg. Moreover, the compounds α-isopropyl-α-(2-diethylaminoethyl)-1-naphthyl-acetic acid and α-isopropyl-α-(2-methylethylaminoethyl)-1-naphthylacetic acid have a good hypoglycemic activity coupled with low toxicity; the $LD_{50}$ of these compounds, administered orally, is 4,000 mg./kg. and about 2,500 mg./kg. respectively.

The "short-chain" α-substituted 1-naphthylacetic acids of Formula I as defined above may be incorporated into pharmaceutical compositions comprising as active ingredient at least one of the α-substituted 1-naphthylacetic acids in association with a pharmaceutical carrier or excipient. The pharmaceutical compositions may take the same form as the pharmaceutical compositions described above containing α-substituted 1-naphthylacetamides. The compositions containing α-substituted 1-naphthylacetic acids are advantageously formulated as dosage units, each dosage unit being adapted to supply a single dose of the active ingredient. Each dosage unit may conveniently contain 25 to 1,000 mg., and preferably 50 to 500 mg., of the active ingredient.

According to a yet further feature of the present invention, there are provided "long-chain" α-substituted 1-naphthylacetic acids of the general formula

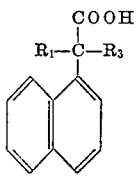

I in which $R_1$ represents the group

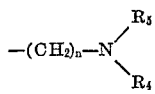

(wherein $R_4$ and $R_5$, which may be the same or different, each represents an alkyl group or $R_4$ and $R_5$ together with the adjacent nitrogen atom represent a heterocyclic group which may contain a further hetero atom, and $n$ represents an integer from 3 to 5); and $R_3$ represents an alkyl group or any group which may be represented by $R_1$; and non-toxic salts thereof. The non-toxic salts may be salts formed with acids or bases. The term "long chain" is used herein in relation to compounds of Formula I to designate such compounds in which the alkyl radical of the α-aminoalkyl group contains over two carbon atoms.

It will be appreciated that the "long-chain" α-substituted 1-naphthylacetic acids in which $R_1$ and $R_3$ represent different groups contain an asymmetric carbon atom. Optical isomers of such compounds as well as racemic mixtures thereof are included within the scope of the present invention.

The "long-chain" α-substituted 1-naphthylacetic acids have valuable pharmacological properties. In particular, the compounds in general possess useful hypoglycemic activity coupled with a relatively low toxicity.

In long-chain compounds of the Formula I in which $R_3$, $R_4$ and/or $R_5$ represent alkyl groups, they preferably represent lower alkyl groups containing from 1 to 6 carbon atoms e.g. methyl, ethyl, propyl, isopropyl, butyl, sec. butyl, amyl and/or hexyl groups. Where $R_4$ and $R_5$ together with the adjacent nitrogen atom to which they are bonded, represent a heterocyclic group, they preferably represent a saturated heterocyclic group such as, for example, a pyrrolidino, piperidino or morpholino group.

The non-toxic acid addition salts of long-chain compounds of Formula I may be formed both with organic and inorganic acids. Preferred non-toxic acid addition salts include, for example, hydrochlorides, hydrobromides, sulphates, formates, acetates, citrates, tartrates, maleates, cyclohexyl sulphamates, methanesulphonates and ethanedisulphonates. The salts with bases include salts formed both with organic and inorganic bases.

As stated above, the "long-chain" α-substituted 1-naphthylacetic acids according to the invention have valuable hypoglycemic activity coupled with relatively low toxicity. Particularly useful compounds according to the invention by virtue of their especially favourable activity and toxicity properties are α,α - di(3 - dimethylaminopropyl)-1-naphthylacetic acid and α,α-di(3-diethylaminopropyl)-1-naphthylacetic acid ($LD_{50}$ upon oral administration of 4,000 and 5,000 mg./kg. respectively).

The "long-chain" α-substituted 1-naphthylacetic acids of Formula I may be incorporated into pharmaceutical compositions for oral administration comprising as active ingredient at least one of the "long-chain" α-substituted 1-naphthylacetic acids in association with a pharmaceutical carrier or excipient. These pharmaceutical compositions may take the same form as the pharmaceutical compositions suitable for oral administration described above and containing α-substituted 1-naphthylacetamides. The compositions containing long-chain α-substituted 1-naphthylacetic acids are advantageously formulated as dosage units, each dosage unit being adapted to supply a single dose of the active ingredient. Each dosage unit may conveniently contain 100 to 1,000 mg. and preferably 200 to 600 mg. of the active ingredient. Examples of dosage unit forms are tablets, capsules, dragees and pills.

The "short chain" and "long-chain" α-substituted 1-naphthylacetic acids (in which $R_3$ is other than hydrogen) are preferably prepared by a process which comprises reacting an amide of the formula

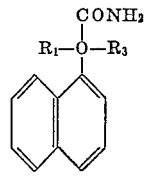

II with nitrous acid or nitrous anhydride. In one particularly convenient method of carrying out this process, the nitrous acid is prepared in situ in the reaction mixture by reaction of an alkyl nitrite, for example butyl, isoamyl or octyl nitrite, with a strong acid, for example hydrochloric, hydrobromic or sulphuric acid. The reaction is advantageously carried out in the presence of an organic solvent such as, for example, glacial acetic acid.

In one particularly convenient method according to the invention, isoamyl nitrite is added, at room temperature, to a solution of an amide of Formula II in glacial acetic acid, which solution has been previously saturated with gaseous hydrochloric acid. The mixture is maintained at room temperature for 1 to 4 hours and is then heated for 6 to 18 hours at a temperature ranging from 80° C. to the reflux temperature of the mixture. Where compounds of the Formula II in which the groups $R_1$ and $R_3$ have a particularly pronounced steric hindrance effect are concerned, the above reaction procedure may require repeating a number of times until a sample of the reaction product, after removal of solvent, is completely soluble in a 10% aqueous solution of NaOH; repetition of the procedure from 2 to 6 times in general will be sufficient to complete the reaction and yield a pure product.

"Short-chain" α-substituted 1-naphthylacetic acids of the Formula I (in which $R_3$ represents hydrogen), may be prepared by a process which comprises hydrolysing a nitrile of the formula

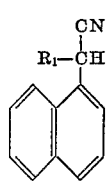

(IV)

The hydrolysis is conveniently carried out under acid conditions, preferably in the presence of a strong aqueous acid e.g. a strong mineral acid such as sulphuric acid. In one preferred process, the hydrolysis is effected in the presence of a strong mineral acid and in addition a liquid carboxylic acid, for example glacial acetic acid. A mixture of concentrated sulphuric acid, glacial acetic acid and water is especially effective. About equal proportions by volume of the mineral acid and liquid carboxylic acid are preferably used and, in a particularly convenient process, the quantities by volume of water and each of the two acids used for the hydrolysis are substantially equal. The hydrolysis is conveniently effected at elevated temperatures, advantageously at the reflux temperature of the reaction mixture.

The nitriles of Formula IV useful as starting materials in the above-described process according to the invention may be prepared as described in co-pending U.S. application Ser. No. 323,259, filed Nov. 13, 1965, now abandoned.

Both the "short-chain" and "long-chain" α-substituted 1-naphthylacetic acids of the Formula I prepared as described above are conveniently separated from the reaction mixture in the form of their acid addition salts e.g. hydrochlorides. They may be purified in any convenient way, for example by crystallisation from a suitable solvent or mixture of solvents. The hydrochlorides of compounds of the Formula I are in general white crystalline solids soluble in water and also in aqueous solutions of alkali (with formation of the corresponding base salts), slightly soluble in ethanol and propanol but practically insoluble in benzene, ether, petroleum ether and hexane.

Acid addition salts, e.g. the hydrochlorides of compounds of the Formula I, may be converted into the corresponding free amino acids by treatment with an equivalent of a base. The free amino acids of Formula I thus obtained are in general white crystalline solids soluble in aqueous acid and alkali solutions with formation of the corresponding salts.

The free amino acids of Formula I may be converted to further salts with acids or bases by treatment with the equivalent amount of acid or base.

The following examples illustrate the preparation of $\alpha$-substituted 1-naphthylacetic acids (and salts thereof) according to the invention and also pharmaceutical compositions containing such compounds as active ingredients:

Example 1

A stream of dry hydrochloric acid is slowly bubbled, for one and a half hours and at room temperature, through an externally cooled solution of 40 g. of $\alpha$-isopropyl-$\alpha$-(2-dimethylaminoethyl)-1-naphthylacetamide in 200 ml. of glacial acetic acid. 50 ml. of freshly distilled isoamyl nitrite are then added during 2 hours and with stirring. The bright red solution thereby obtained is maintained for a further two hours, at room temperature and then for 8 hours at 100° C. The solvent is thereafter distilled off from the reaction mixture at 50° C. in vacuo, the residue disintegrated with ether and the solid thus formed crystallised from ethanol:ligroin (3:1). The $\alpha$-isopropyl-$\alpha$-(2-dimethylaminoethyl)-1-naphthylacetic acid hydrochloride thereby obtained is a white crystalline solid melting at 227–228° C.

*Analysis.*—For $C_{19}H_{26}O_2NCl$. Found, percent: C, 68.15; H, 7.79; N, 4.08; Cl 10.32. Calc., percent: C, 67.93; H, 7.80; N, 4.17; Cl, 10.52.

The following compounds are obtained by a method analogous to that described above:

$\alpha$-methyl-$\alpha$-(2-dimethylaminoethyl)-1-naphthylacetic acid hydrochloride M.P. 257° C. (decomp.) (crystallized from 95% ethanol).
*Analysis.*—For $C_{17}H_{22}O_2NCl$. Found, percent: C, 65.95; H, 7.11; N, 4.38; Cl, 11.41. Calc., percent: C, 66.33; H, 7.20; N, 4.45; Cl, 11.52.

$\alpha$-ethyl-$\alpha$-(2-dimethylaminoethyl)-1-naphthylacetic acid hydrochloride M.P. 236–237° C. [crystallized from ethanol-ligroin (3:1)].
*Analysis.*—For $C_{18}H_{24}O_2NCl$. Found, percent: C, 66.95; H, 7.51; N, 4.29; Cl, 10.94. Calc., percent: C, 67.17; H, 7.52; N, 4.35; Cl, 11.02.

$\alpha$-sec.butyl-$\alpha$-(2-dimethylaminoethyl)-1-naphthylacetic acid hydrochloride M.P. 208–209° C. (decomp.) (crystallized from isopropanol).
*Analysis.*—For $C_{20}H_{28}O_2NCl$. Found percent: C, 68.83; H, 7.93; N, 4.04; Cl, 9.96. Calc., percent: C, 68.65; H, 8.07; N, 4.00; Cl, 10.13.

$\alpha,\alpha$-di-(2-dimethylaminoethyl)-1-naphthylacetic acid dihydrochloride

M.P. 227.5–229° C. (decomp.) [crystallized from ethanol-ligroin (1:1)].
*Analysis.*—For $C_{20}H_{30}O_2N_2Cl_2$. Found, percent: C, 59.20; H, 7.67; N, 6.86; Cl, 17.70. Calc., percent: C, 59.84; H, 7.53; N, 6.98; Cl, 17.67.

$\alpha$-methyl-$\alpha$-(2-piperidinoethyl)-1-naphthylacetic acid hydrochloride M.P. 255–256° C. (crystallized from 95% ethanol).
*Analysis.*—For $C_{20}H_{26}O_2NCl$. Found, percent: C, 68.72; H, 7.43; N, 4.10; Cl, 10.17. Calc., percent: C, 69.05; H, 7.53; N, 4.03; Cl, 10.19.

$\alpha$-ethyl-$\alpha$-(2-piperidinoethyl)-1-naphthylacetic acid hydrochloride

M.P. 246–247° C. (crystallized from ethanol).
*Analysis.*—For $C_{21}H_{28}O_2NCl$. Found, percent: C, 69.65; H, 7.73; N, 3.93; Cl, 9.68. Calc., percent: C, 69.69; H, 7.80; N, 3.87; Cl, 9.80.

$\alpha$-isopropyl-$\alpha$-(2-piperidinoethyl)-1-naphthylacetic acid hydrochloride M.P. 214–215° C. (decomp.) [crystallized from ethanol-ligroin (3.2)].
*Analysis.*—For $C_{22}H_{30}O_2NCl$. Found, percent: C, 70.39; H, 8.06; N, 3.66; Cl, 9.44. Calc., percent: 70.29; H, 8.05; N, 3.72; Cl, 9.43.

$\alpha$-sec.butyl-$\alpha$-(2-piperidinoethyl)-1-naphthylacetic acid hydrochloride M.P. 218–220° C. (decomp.) (crystallized from ethanol).
*Analysis.*—For $C_{23}H_{32}O_2NCl$. Found, percent: C, 70.04; H, 8.10; N, 3.48; Cl,8.83. Calc., percent: C, 70.84; H, 8.27; N, 3.59; Cl, 9.09.

$\alpha,\alpha$-di-(2-piperidinoethyl)-1-naphthylacetic acid dihydrochloride

M.P. 214.5–216° C. [crystallized from ethanol-ligroin (1:4)].
*Analysis.*—For $C_{26}H_{38}O_2N_2Cl_2$. Found, percent: C, 63.90; H, 7.94; N, 5.72; Cl, 14.42. Calc., percent: C, 64.85; H, 7.96; N, 5.82; Cl, 14.73.

$\alpha$-methyl-$\alpha$-(2-morpholinoethyl)-1-naphthylacetic acid hydrochloride M.P. 245–246° C. (crystallized from 95% ethanol).
*Analysis.*—For $C_{19}H_{24}O_3NCl$. Found, percent: C, 65.90; H, 7.09; N, 4.10; Cl, 10.15. Calc., percent: C, 65.22; H, 6.91; N, 4.00; Cl, 10.14.

$\alpha$-ethyl-$\alpha$-(2-morpholinoethyl)-1-naphthylacetic acid hydrochloride

M.P. 244–245° C. (crystallized from 90% ethanol).
*Analysis.*—For $C_{20}H_{26}O_3NCl$. Found, percent: C, 65.70; H, 7.12; N, 3.88; Cl, 9.56. Calc., percent: C, 66.01; H, 7.20; N, 3.85; Cl, 9.74.

$\alpha$-isopropyl-$\alpha$-(2-morpholinoethyl)-1-naphthylacetic acid hydrochloride M.P. 203–204° C. (decomp.) [crystallized from ethanol-ligroin (1:1)].
*Analysis.*—For $C_{21}H_{28}O_3NCl$. Found, percent: C, 66.11; H, 7.62; N, 3.76; Cl, 9.19. Calc., percent: C, 66.74; H, 7.47; N, 3.71; Cl, 9.38.

$\alpha$-sec.butyl-$\alpha$-(2-morpholinoethyl)-1-naphthylacetic acid hydrochloride M.P. 222° C. (decomp.) (crystallized from ethanol).
*Analysis.*—For $C_{22}H_{30}O_3NCl$. Found, percent: C, 66.88; H, 7.84; N, 3.49; Cl, 9.01. Calc., percent: C, 67.41; H, 7.72; N, 3.57; Cl, 9.05.

$\alpha,\alpha$-di-(2-morpholinoethyl)-1-naphthylacetic acid dihydrochloride

M.P. 22–223° C. (decomp.) (crysetallized from ethanol).
*Analysis.*—For $C_{24}H_{34}O_4N_2Cl_2$. Found, percent: C, 58.85; H, 7.14; N, 5.72; Cl, 14.35. Calc., percent: C, 59.38; H, 7.06; N, 5.77; Cl, 14.61.

α-isopropyl-e-(2-methylethylaminoethyl)-1-naphthylacetic acid hydrochloride

M.P. 190–192° C. (crystallized from ethanol-ether).
*Analysis.*—For $C_{20}H_{28}O_2NCl$. Found, percent: C, 68.15; H, 8.14; N, 3.92; Cl, 10.01. Calc., percent: C, 68.65; H, 8.07; N, 4.00; Cl, 10.13.

α-isopropyl-α-(2-diethylaminoethyl)-1-naphthylacetic acid hydrochloride

M.P. 195–196° C. (decomp.) (crystallized from isopropanol).
*Analysis.*—For $C_{21}H_{30}O_2NCl$. Found, percent: C, 69.84; H, 8.38; N, 3.93; Cl, 9.80. Calc., percent: C, 69.31; H, 8.31; N, 3.85; Cl, 9.74.

Example 2

50 g. of α-(2-morpholinoethyl)-1-naphthylacetonitrile are hydrolised by refluxing for 2 hours with a mixture of 65 ml. of 98% sulphuric acid, 65 ml. of acetic acid and 65 ml. of water. After cooling, the reaction mixture is diluted with 200 ml. of water and extracted twice with a total of 200 ml. of ether. The aqueous layer is made alkaline to phenolphthalein with 30% sodium hydroxide, extracted twice with ether and then acidified with 1:1 hydrochloric acid to a pH of 1. The aqueous acid solution is evaporated to dryness under reduced pressure and the residue four times extracted with a total of 800 ml. of boiling ethanol. The ethanolic extracts are combined, evaporated to dryness and the residue crystallized from 90% ethanol. The α-(2-morpholinoethyl)-1-naphthylacetic acid hydrochloride thus obtained is a white crystalline solid melting at 261–262° C.

*Analysis.*—For $C_{18}H_{22}O_3NCl$. Found, percent: C, 64.16; H, 6.64; N, 4.15; Cl. 10.23. Calc., percent: C, 64.37; H, 6.60; N, 4.17; Cl, 10.56.

The following compounds are obtained by a method analogous to that described above:

α-(2-dimethylaminoethyl)-1-naphthylacetic acid hydrochloride

M.P. 226–227° C. (crystallized from ethanol:ether).
*Analysis.*—For $C_{16}H_{20}O_2NCl$. Found, percent: C, 65.30; H, 6.91; N, 4.79; Cl, 11.83. Calc., percent: C, 65.41; H, 6.86; N, 4.77; Cl, 12.07.

α-(2-diethylaminoethyl)-1-naphthylacetic acid hydrochloride

M.P. 207–208° C. (decomp.) [crystallized from ethanol-isopropanol (1:1)]
*Analysis.*—For $C_{18}H_{24}O_2NCl$. Found, percent: C, 67.13; H 7.59; N, 4.29; Cl 10.92. Calc., percent: 67.17; H, 7.52; N, 4.35; Cl, 11.02.

Example 3

40 g. of α-(2-piperidinoethyl)-1-naphthylacetonitrile are hydrolised (by a method analogous to that described in the previous example) with a mixture of 52 ml. of 98% sulphuric acid, 52 ml. of acetic acid and 52 ml. of water. After dilution with 100 ml. of water and extraction with ether, the reaction mixture is made alkaline to phenophthalein with 50% sodium hydroxide. An oily mass is obtained which is separated, washed with ether and then treated with conc. hydrochloric acid to a pH of 1. The oily layer is again separated, dissolved in isopropanol and dried over calcium chloride. After filtration with charcoal, the solution is treated with ether and the precipitated tarry solid is separated by filtration. The filtered compound is disintegrated with acetone and then crystallized from isopropanol. The α-(2-piperidinoethyl)-1-naphthylacetic acid hydrochloride thus obtained is a white crystalline solid melting at 197–199° C.

*Analysis.*—For $C_{19}H_{24}O_2NCl$. Found, percent: C, 68.21; H, 7.22; N, 4.06; Cl, 10.51. Calc., percent: C, 68.35; H, 7.24; N, 4.19; Cl, 10.62.

Example 4

A solution of sodium ethoxide obtained by dissolving 0.23 g. (0.01 atom) of sodium in 20 ml. of absolute ethanol is added to a suspension of 3.64 g. (0.01 mole) of α-ethyl-α-(2-morpholinoethyl)-1-naphthylacetic acid hydrochloride in 20 ml. of absolute ethanol. The mixture is maintained, with stirring, at 40° C. for 1 hour. The suspended solid is then filtered off and washed with water to eliminate the sodium chloride formed during the reaction. After crystallization from 90 percent ethanol, α-ethyl-α-(2-morpholinoethyl)-1-naphthylacetic acid is obtained as a colourless crystalline solid melting at 236–237° C.

Example 5

A stream of gaseous hydrochloric acid is slowly bubbled, for one and a half hours and at room temperature, through an externally cooled solution of 40 g. of α-ethyl-α-(3-dimethylaminopropyl)-1-naphthylacetamide in 200 ml. of glacial acetic acid. 50 ml. of freshly distilled isoamyl nitrite are then added during 2 hours and with stirring. The bright red solution thereby obtained is maintained for a further two hours at room temperature and then for 8 hours at 100° C. The solvent is thereafter distilled off from the reaction mixture at 50° C. at reduced pressure, the residue is disintegrated with ether and the solid thus formed crystallized from ethanol. The α-ethyl-α-(3-dimethylaminopropyl)-1-naphthylacetic acid hydrochloride thus obtained is a white crystalline solid melting at 251–252° C. with decomp.

*Analysis.*—For $C_{19}H_{26}NO_2Cl$. Found, percent: C, 67.67; H, 7.81; N, 4.15; Cl, 10.40. Calc., percent: C, 67.93; H, 7.80; N, 4.17; Cl, 10.52.

The following compounds are prepared by an analogous method:

α,α-di-(3-dimethylaminopropyl)-1-naphthylacetic acid dihydrochloride

M.P. 241–242° C. (decomp.) (crystallized from ethanol).
*Analysis.*—For $C_{22}H_{34}N_2O_2Cl_2$. Found, percent: C, 61.04; H, 7.94; N, 6.47; Cl, 16.38. Calc., percent: C, 61.53; H, 7.98; N, 6.53; Cl, 16.51.

α-isopropyl-α-(3-diethylaminopropyl)-1-naphthylacetic acid hydrochloride

M.P. 205–206° C. (decomp.) [crystallised from acetone/isopropanol (2:1)].
*Analysis.*—For $C_{22}H_{32}NO_2Cl$. Found, percent: C, 69.12; H, 8.40; N, 3.61; Cl, 9.35. Calc., percent: C, 69.91; H, 8.54; N, 3.71; Cl, 9.38.

Example 6

A stream of gaseous hydrochloric acid is slowly bubbled, for one and a half hours and at room temperature, through an externally cooled solution of 40 g. of α-isopropyl - α-(3-dimethylaminopropyl)-1-naphthylacetamide in 200 ml. of glacial acetic acid. 50 ml. of freshly distilled isoamyl nitrite are then added during 2 hours and with stirring. The bright red solution thereby obtained is maintained for a further 2 hours at room temperature and is then refluxed for 14 hours.

The above procedure is repeated several times until a sample of the reaction mixture, after evaporation to dryness, yields a residue soluble in 10% NaOH. This indicates completion of the reaction, and the product is separated as described in the previous example and crystallised from ethanol-ligroin (3:1). The α-isopropyl-α-(3-dimethylaminopropyl)-1-naphthylacetic acid hydrochloride thus obtained is a white crystalline solid melting at 228–229° C. dec.

*Analysis.*—For $C_{20}H_{28}NO_2Cl$. Found, percent: C, 67.98; H, 7.99; N, 4.06; Cl, 10.04. Calc., percent: C, 68.65; H, 8.07; N, 4.00; Cl, 10.13.

The following compounds are prepared by an analogous method:

α-isopropyl-α-(3-pyrrolidinopropyl)-1-naphthylacetic
acid hydrochloride

M.P. 172–173° C. decomp. (crystallised from acetone).
*Analysis.*—For $C_{22}H_{30}NO_2Cl$. Found, percent: C, 70.54; H, 8.11; N, 3.70; Cl, 9.35. Calc., percent: C, 70.29; H, 8.05; N, 3.72; Cl, 9.43.

α-isopropyl-α-(3-piperidinopropyl)-1-naphthylacetic
acid hydrochloride

M.P. 227–228° C. decomp. (crystallised from isopropanol)
*Analysis.*—For $C_{23}H_{32}NO_2Cl$. Found, percent: C, 70.91; H, 8.31; N, 3.61; Cl, 9.10. Calc., percent: C, 70.84; H, 8.27; N, 3.59; Cl, 9.09.

α-isopropyl-α-(3-morpholinopropyl)-1-naphthylacetic
acid hydrochloride

M.P. 226–227° C. decomp. (crystallised from ethanol).
*Analysis.*—For $C_{22}H_{30}NO_3Cl$. Found, percent: C, 67.08; H, 7.80; N, 3.52; Cl, 9.09. Calc. percent: C, 67.41; H, 7.72; N, 3.57; Cl, 9.05.

α-isopropyl-α-(4 - dimethylaminobutyl)-1-naphthylacetic
acid hydrochloride

M.P. 238–239° C. (crystallised from ethanol:ligroin 3:2).
*Analysis.*—For $C_{21}H_{30}NO_2Cl$. Found, percent: C, 68.94; H, 8.30; N, 3.76; Cl, 9.77. Calc., percent: C, 69.31; H, 8.31; N, 3.85; Cl, 9.74.

α,α-di-(3-diethylaminopropyl)-naphthylacetic
acid dihydrochloride

M.P. 231–232° C. (decomp.) (crystallised from isopropanol)
*Analysis.*—For $C_{26}H_{42}N_2O_2Cl_2$. Found, percent: C, 63.09; H, 8.83; N, 5.63; Cl, 14.43. Calc., percent: C, 64.31; H, 8.72; N, 5.77; Cl, 14.61.

Example 7

A solution of sodium ethoxide obtained by dissolving 0.23 g. (0.01 atom) of sodium in 20 ml. of absolute ethanol is added to a suspension of 3.35 g. (0.01 mole) of α-ethyl-α-dimethylaminopropyl-1-naphthylacetic acid hydrochloride in 20 ml. of absolute ethanol. The mixture is maintained, with stirring, at 40° C. for 1 hour, then the suspended solid is separated by filtration and repeatedly extracted with hot ethanol. The filtrate solution and the combined ethanolic extracts are evaporated to dryness under reduced pressure and the residue is then crystallized from ethanol and dried under vacuum at 100° C. The so obtained α-ethyl-α-dimethylaminopropyl-1-naphthylacetic acid is a colourless and crystalline solid which melts at 193–194° C.

I claim:

1. α-Methyl-α-(2-morpholinoethyl) - 1 - naphthylacetic acid.
2. α-Isopropyl-α-(2-diethylaminoethyl) - 1 - naphthylacetic acid.
3. α-Isopropyl-α-(2-methylethylaminoethyl) - 1 - naphthylacetic acid.
4. A compound selected from the group consisting of a compound of the formula

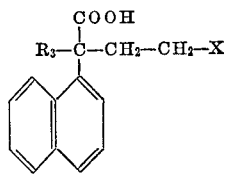

and a non-toxic salt thereof, wherein X is a member selected from the group consisting of morpholino, piperidino and

wherein $R_4$ and $R_5$ are alkyl of from 1 to 6 carbon atoms, and $R_3$ is selected from the group consisting of alkyl of from 1 to 6 carbon atoms and —$CH_2$—$CH_2$—X, wherein X has the same meaning as above.

5. A compound selected from the group consisting of a compound of the formula

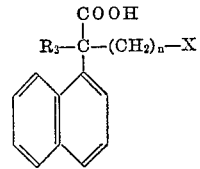

and a non-toxic salt thereof, wherein X is a member selected from the group consisting of morpholino, piperidino, pyrrolidino and

wherein $R_4$ and $R_5$ are alkyl of from 1 to 6 carbon atoms, and $n$ represents an integer of from 3 to 5; and $R_3$ is selected from the group consisting of alkyl of from 1 to 6 carbon atoms and —$(CH_2)_n$—X, wherein X and $n$ have the same meaning as above.

6. A compound selected from the group consisting of α, α-di-(3-dimethylaminopropyl)-1 - naphthylacetic acid and α, α-di-(3-dimethylaminopropyl) - 1 - naphthylacetic acid.

7. A compound according to claim 4 which is a non-toxic acid addition salt selected from the group consisting of a hydrochloride, hydrobromide, sulphate, formate, acetate, citrate, tartrate, maleate and cyclohexyl sulphamate.

8. A compound according to claim 5 which is a non-toxic acid addition salt selected from the group consisting of a hydrochloride, hydrobromide, sulphate, formate, acetate, citrate, tartrate, maleate, cyclohexyl sulphamate, methanesulphamate and ethane disulphonate.

References Cited

FOREIGN PATENTS 796,839  6/1958  Great Britain.

OTHER REFERENCES

Casadio et al.: Chemical Abstracts, vol. 59, pp. 1549–1550 (1963), (effective date of abstract is 1962).

Martennson et al.: A.C.T.A. Chem. Scand., vol. 14, pp. 1136–1137, (1960).

NICHOLAS S. RIZZO, *Primary Examiner.*

ALEX MAZEL, JOSE TOVAR, *Examiners.*